May 2, 1933.  R. R. BLECHA  1,907,278
HYDRAULIC TRANSMISSION
Filed Aug. 30, 1932  3 Sheets-Sheet 1

Inventor
R. R. Blecha
By Clarence A O'Brien
Attorney

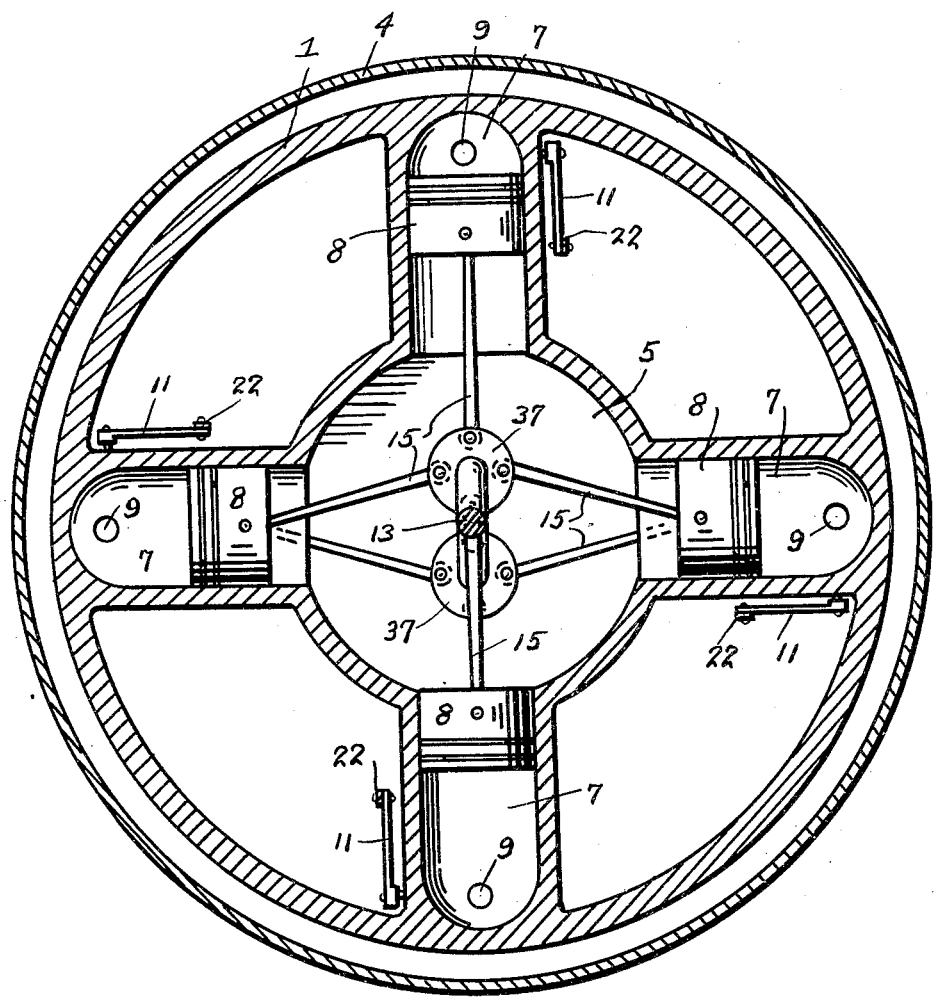

Patented May 2, 1933

1,907,278

UNITED STATES PATENT OFFICE

ROBERT R. BLECHA, OF BROOKS FIELD, TEXAS

HYDRAULIC TRANSMISSION

Application filed August 30, 1932. Serial No. 631,081.

The present invention relates to new and useful improvements in hydraulic transmissions particularly for automobiles, and has for its primary object to provide, in a manner as hereinafter set forth, a device of this character embodying a novel construction, combination and arrangement of parts through the medium of which any desired relative speeds between a drive and driven shaft may be had.

Other objects of the invention are to provide a transmission of the aforementioned character which will be simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a view in vertical transverse section through the transmission, taken substantially on the line 3—3 of Figure 1 and looking in the direction indicated by the arrows.

Figure 1:
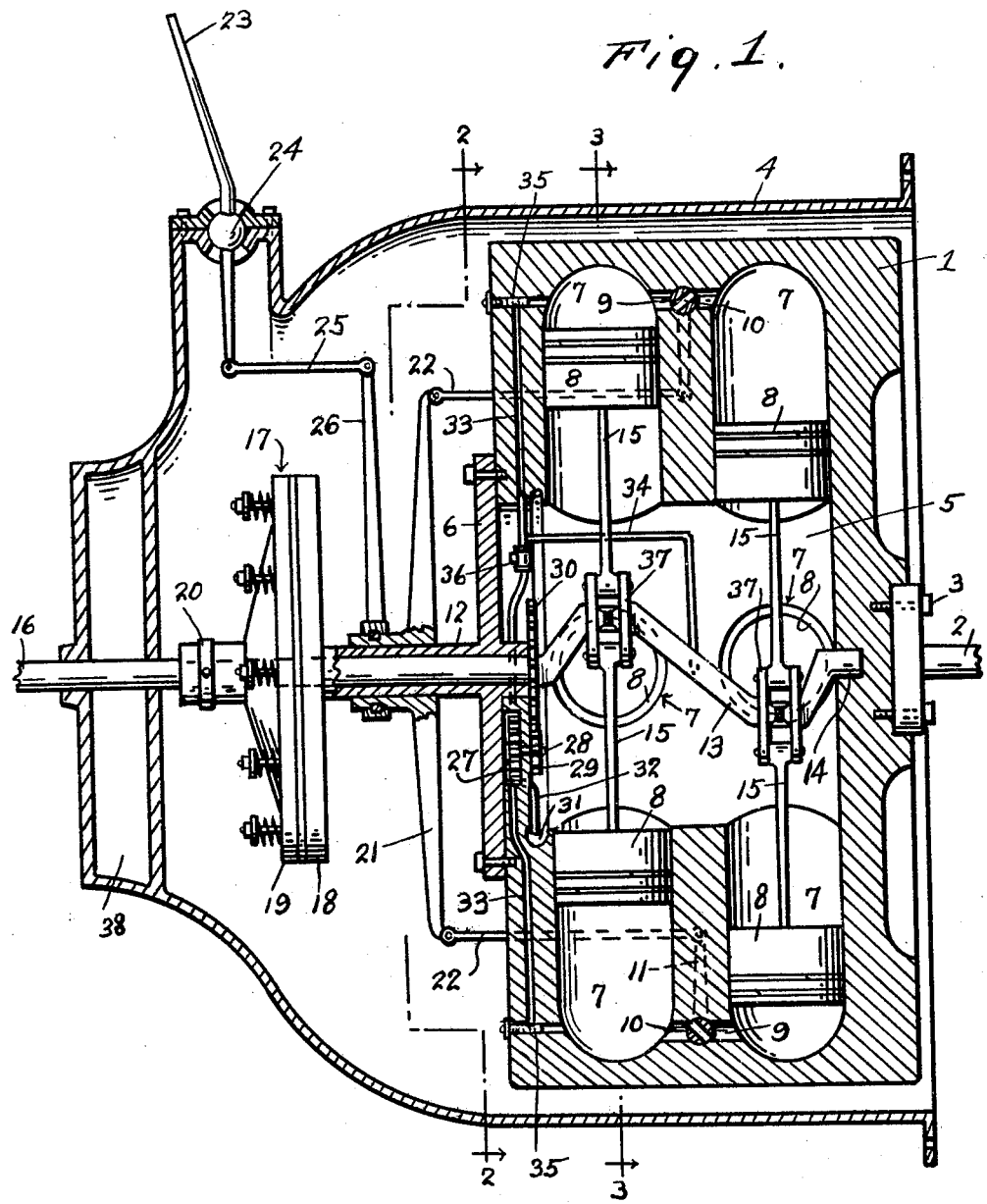
Figure 1 is a view in vertical longitudinal section through a hydraulic transmission constructed in accordance with the present invention.
Figure 2:
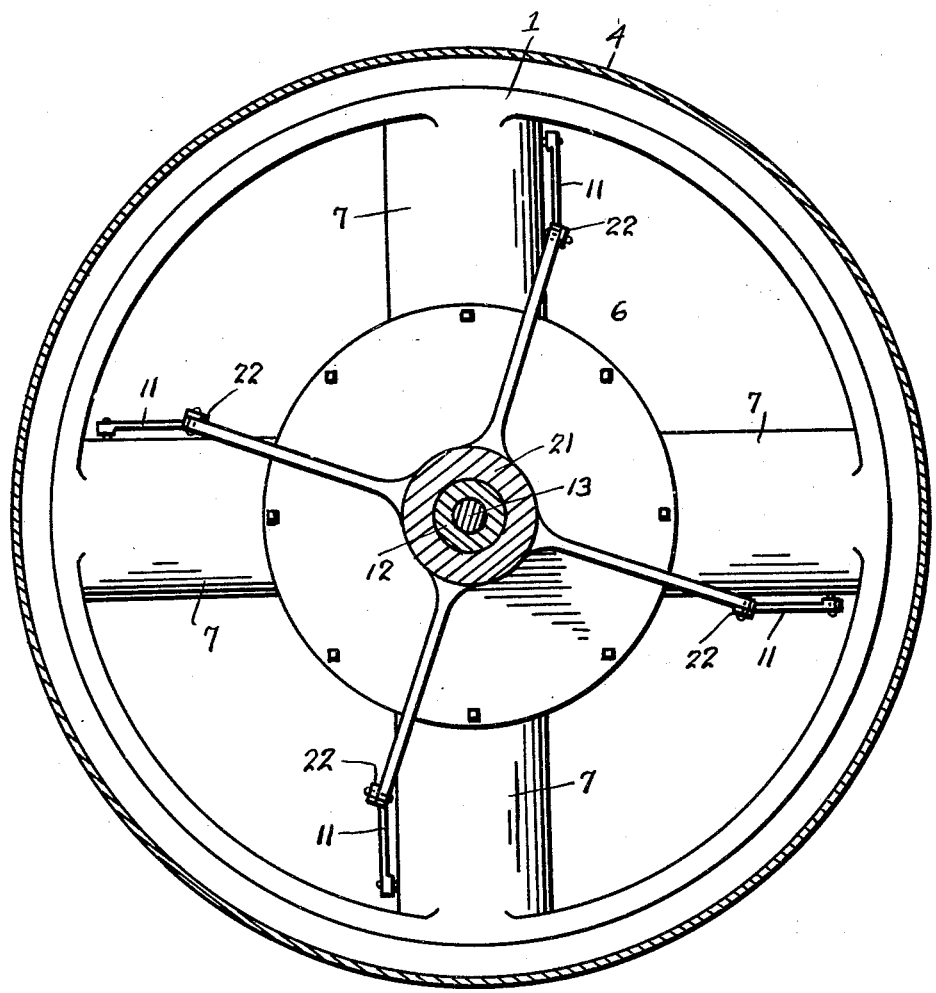
Figure 2 is a view in vertical transverse section, taken substantially on the line 2—2 of Figure 1, looking in the direction indicated by the arrows.

Referring now to the drawings in detail, it will be seen that the embodiment of the present invention which has been illustrated comprises a flywheel 1 which is fixed on the rear end of the engine crank shaft 2, as at 3.

The flywheel 1 is operable in a housing 4 and is formed to provide a central oil chamber 5 which is closed at the rear by a removable plate 6. Radiating from the chamber 5 are pairs of cylinders 7 in which the pistons 8 are mounted for reciprocation. The cylinders 7 constituting each pair communicate with each other through the passages 9 which are controlled by rotary valves 10 having actuating arms 11 thereon.

The plate 6 is formed integrally with an elongated bearing 12 in which one end portion of a crank shaft 13 is journaled, said crank shaft 13 being operable in the chamber 5 of the flywheel 1 and having its other end portion journaled in a bearing provided therefor in the forward end of said flywheel, as at 14. Connecting rods 15 couple the pistons 8 to the crank shaft 13. It will be noted that the construction and arrangement is such that the pistons 8 constituting each pair move in opposite directions.

Extending rotatably into the housing 4 from the rear thereof is a propeller shaft 16 which, of course, is aligned with the shafts 2 and 13. A conventional disk clutch is designated generally by the reference numeral 17, said disk clutch being operable in the rear portion of the housing 4 and comprising the members 18 and 19 which are mounted on the shafts 13 and 16, respectively. The clutch 17, of course, constitutes means for releasably connecting the shaft 16 to the transmission shaft 13. Any suitable means may be provided for disengaging the clutch 17, said means being connected to the clutch, as at 20.

Slidably mounted on the bearing 12 is a spider 21 having the free end portions of its legs operatively connected to the valve arms 11 by links 22. An operating lever 23 is mounted, as at 24, for swinging movement on the rear portion of the housing 4, said lever 23 extending into the housing and being operatively connected to the spider 21 by elements 25 and 26. It will thus be seen that an arrangement is provided whereby the control valves 10 may be simultaneously and uniformly regulated.

The rear portion of the flywheel 1 has formed therein a chamber in which a gear pump 27 is operable. The plate 6 constitutes one of the walls of the chamber in which the pump gears are enclosed. One of the pump gears is fixed on a shaft 28 extending into the oil chamber 5 and having fixed thereon a gear 29 which is constantly in mesh with a comparatively large gear 30 which is fixed on the crank shaft 13. Thus, when relative movement occurs between the flywheel 1 and the crank shaft 13, the pump 27 will be actuated. An annular channel or sump 31 is formed in the rear portion of the periphery of the oil chamber 5 in which a supply of oil is constantly maintained by centrifugal force when the flywheel 1 is rotating. A supply pipe 32 from the pump 27 has its intake end disposed in the channel 31 for conveying the oil from said channel to the pump. Ducts and pipes 33 and 34, respectively, are provided for conveying the oil from the pump 27 to the adjacent cylinder 7 of each pair of cylinders. Check valves are provided, as at 35, for preventing the return of the oil to the pump 27. The reference numeral 36 designates an adjustable pressure release valve.

In operation, when the valves 10 are in open position, the oil is, of course, free to flow back and forth between the pairs of cylinders 7, thus permitting the pistons 8 to reciprocate freely in the cylinders and allowing the flywheel 1 to rotate without imparting rotary movement to the crank shaft 13. As the valves 10 are closed by actuation of the lever 23, the flow of oil between the pairs of cylinders is restricted, thus providing resistance for the pistons 8 and causing the shaft 13 to be rotated. When the valves 10 are partially open the crank shaft 13 will, of course, be driven at less speed than the flywheel 1. However, when the valves 10 are closed the pistons 8 will be locked against movement in the cylinders 7 and the crank shaft 13 will rotate in unison with the flywheel 1. The supply of oil in the cylinders 7 is constantly maintained by the pumps 7. Should any of the oil leak past the pistons 8 which, of course, are equipped with rings, thus permitting slippage or relative movement between the flywheel 1 and the crank shaft 13, the pump 27 will be immediately actuated for replacing the lost oil. The connecting rod bearings on the crank shaft 13 are designated by the reference numeral 37.

The rear portion of the housing 4 is formed to provide a chamber 38. This chamber 38 is for the reception of a reverse gear unit (not shown) which may constitute the subject matter of another application. The reverse gear unit herein referred to, of course, will constitute means for permitting the shaft 16 to be driven in either direction by the hydraulic transmission constituting the subject matter of the present application, thus permitting the vehicle to be driven forwardly or rearwardly.

It is believed that the many advantages of a hydraulic transmission for vehicles constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed as new is:—

1. A hydraulic transmission comprising a flywheel having an oil chamber therein, pairs of cylinders radiating from the oil chamber, the flywheel having passages therein establishing communication between the pairs of cylinders, valves controlling the passages, a crank shaft operable in the oil chamber, pistons operable in the cylinders and connected to the crank shaft, means for actuating the valves in unison, and pump means operable by the crank shaft for supplying oil under pressure to the cylinders from the oil chamber.

2. A hydraulic transmission comprising a flywheel having an oil chamber therein, pairs of cylinders radiating from the oil chamber, the flywheel further having passages therein establishing communication between the pairs of cylinders, valves for controlling the passages, means for actuating the valves, a crank shaft operable in the oil chamber, pistons mounted for reciprocation in the cylinders and operatively connected to the crank shaft, and means for supplying oil to the cylinders from the oil chamber, said means including a pump mounted on the flywheel for rotation therewith and having communication with the cylinders, and means operatively connecting the pump to the crank shaft for actuation thereby when relative movement occurs between said crank shaft and the flywheel.

3. A hydraulic transmission comprising a flywheel having an oil chamber therein, pairs of cylinders radiating from the oil chamber, the flywheel further having valve controlled passages establishing communication between the pairs of cylinders, the flywheel still further having an annular channel in the periphery of the oil chamber for the reception of oil from said chamber, a pump mounted on the flywheel for rotation therewith, means connecting the cylinders with the pump for receiving oil from said pump, means connecting the pump to the crank shaft for actuation by said crank shaft when relative movement occurs between the flywheel and the crank shaft, and a conduit extending from the pump to the channel for conveying oil from said channel to said pump.

4. A hydraulic transmission comprising a housing, a flywheel operable in the housing having an oil chamber therein, pairs of cylinders radiating from the oil chamber, said oil chamber being open at one end, the flywheel further having valve controlled passages extending between the pairs of cylinders, a plate closing the open end of the oil chamber, the flywheel still further having a pump chamber therein, the plate constituting one of the walls of the pump chamber, a gear pump operable in the pump chamber, means connecting the cylinders with the pump chamber for receiving oil therefrom, a crank shaft operable in the oil chamber, pistons mounted for reciprocation in the cylinders and operatively connected to the crank shaft, gears operatively connecting the pump gears to the crank shaft for actuation thereby when relative movement occurs between the crank shaft and the flywheel.

5. A hydraulic transmission comprising a housing, a flywheel operable in the housing having an oil chamber therein, pairs of cylinders radiating from the oil chamber, said oil chamber being open at one end, the flywheel further having valve controlled passages extending between the pairs of cylinders, a plate closing the open end of the oil chamber, the flywheel still further having a pump chamber therein, the plate constituting one of the walls of the pump chamber, a gear pump operable in the pump chamber, means connecting the cylinders with the pump chamber for receiving oil therefrom, a crank shaft operable in the oil chamber, pistons mounted for reciprocation in the cylinders and operatively connected to the crank shaft, gears operatively connecting the pump gears to the crank shaft for actuation thereby when relative movement occurs between the crank shaft and the flywheel, the flywheel still further having an annular channel in the periphery of the oil chamber for receiving oil from said oil chamber, and a pipe extending between the channel and the pump chamber for conveying the oil from said channel to the pump chamber.

In testimony whereof I affix my signature.

ROBERT R. BLECHA.